(12) United States Patent
Humer et al.

(10) Patent No.: US 7,819,470 B2
(45) Date of Patent: Oct. 26, 2010

(54) MOVEABLE BACK PANEL FOR A VEHICLE SEAT

(75) Inventors: Mladen Humer, West Bloomfield, MI (US); Nagarjun Yetukuri, Rochester Hills, MI (US); Gerald Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/411,434

(22) Filed: Mar. 26, 2009

(65) Prior Publication Data

US 2009/0184546 A1  Jul. 23, 2009

Related U.S. Application Data

(62) Division of application No. 11/465,919, filed on Aug. 21, 2006, now Pat. No. 7,549,699.

(51) Int. Cl.
*B60R 21/00* (2006.01)
(52) U.S. Cl. .............................. 297/216.13; 297/216.14
(58) Field of Classification Search ................................ 297/216.12–216.14
See application file for complete search history.

(56) References Cited

U.S. PATENT DOCUMENTS

| 3,802,737 A | 4/1974 | Mertens |
| 4,335,918 A | 6/1982 | Cunningham |
| 6,022,074 A | 2/2000 | Swedenklef |
| 6,033,018 A | 3/2000 | Fohl |
| 6,199,947 B1 | 3/2001 | Wiklund |
| 6,250,714 B1 | 6/2001 | Nakano et al. |
| 6,523,892 B1 | 2/2003 | Kage et al. |
| 6,550,865 B2 | 4/2003 | Cho |
| 6,604,788 B1 | 8/2003 | Humer |
| 6,702,377 B2 | 3/2004 | Nakano et al. |
| 6,786,544 B1 | 9/2004 | Muraishi |

(Continued)

FOREIGN PATENT DOCUMENTS

DE  198 50 758 A1  5/2000

(Continued)

OTHER PUBLICATIONS

Combined Search and Examination Report for GB07160282.3 dated Dec. 18, 2007.

(Continued)

*Primary Examiner*—Sarah B McPartlin
(74) *Attorney, Agent, or Firm*—Brooks Kushman P.C.

(57) ABSTRACT

A vehicle seat having a seat back including an actuatable back panel. The back panel of the seat back may be moved between a normal, or flush position, and an actuated, or spaced position, relative to the seat back assembly. The back panel may be provided with connectors that may be used to connect the back panel to the seat assembly. The back panel is actuated in the event of a rear end collision to provide added clearance for penetration of an occupant's torso into the seat back without interference by seat accessories, such as an adjustable lumbar system, a bolster assembly, massage assembly, or a heating/cooling system. The seat accessories may be secured to the back panel as a sub-assembly to facilitate manufacture. A resilient member biases a linkage or torsion bar to automatically reset the back panel.

3 Claims, 3 Drawing Sheets

U.S. PATENT DOCUMENTS

| | | |
|---|---|---|
| 6,890,029 B2 | 5/2005 | Svantesson |
| 6,938,953 B2 | 9/2005 | Haland et al. |
| 7,222,915 B2 | 5/2007 | Philippot et al. |
| 2004/0075312 A1 | 4/2004 | Neale |
| 2006/0006709 A1* | 1/2006 | Uno et al. .............. 297/216.12 |
| 2006/0094518 A1 | 5/2006 | Leavitt |
| 2006/0103189 A1* | 5/2006 | Humer et al. .......... 297/216.13 |
| 2006/0255632 A1 | 11/2006 | Sugimoto |

FOREIGN PATENT DOCUMENTS

| | | |
|---|---|---|
| DE | 10114385 A1 | 10/2002 |
| EP | 1714827 A3 | 6/2007 |
| GB | 2438974 A | 12/2007 |
| JP | 2003225138 A | 8/2003 |

OTHER PUBLICATIONS

German Office Action for German Application 10 2007 028 11.39-16 dated Apr. 7, 2008.

* cited by examiner

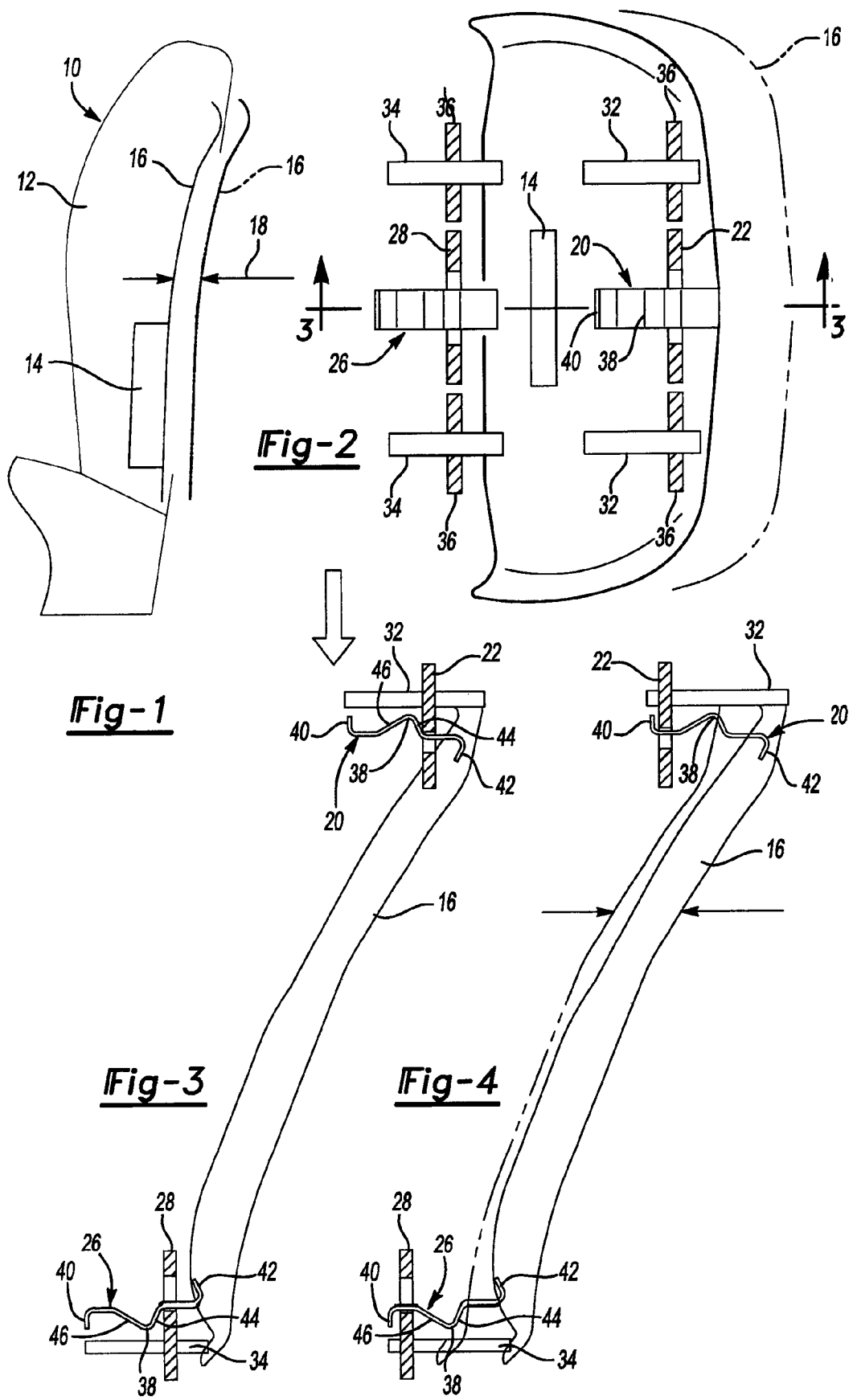

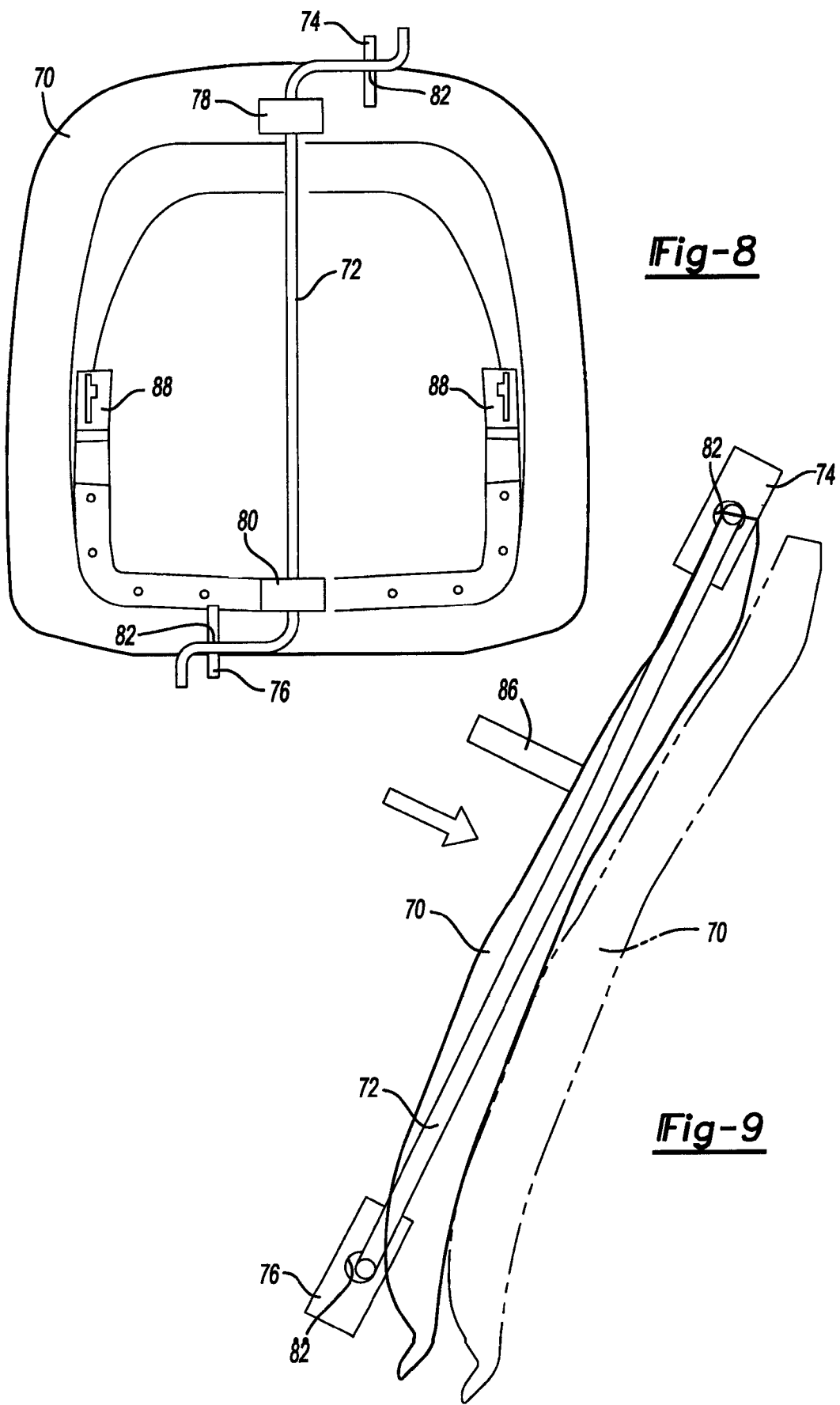

MOVEABLE BACK PANEL FOR A VEHICLE SEAT

CROSS-REFERENCE TO RELATED APPLICATIONS

This application is a division of U.S. application Ser. No. 11/465,919 filed Aug. 21, 2006, now U.S. Pat. No. 7,549,699, issued Jun. 23, 2009.

BACKGROUND OF THE INVENTION

1. Field of the Invention

The present invention relates to a vehicle seat that has a back panel that is movable relative to the seat between a position in which the back panel is flush mounted to the seat and a position in which the back panel is spaced relative to the seat.

2. Background Art

Vehicle seats are relatively complex structures including a combination of sub-systems that may be used to position the seat, provide heating and cooling, provide an adjustable lumbar support, in addition to providing a comfortable seating area for occupants. First and foremost, vehicle seats must provide a safe and comfortable seating area. The size of a vehicle seat must be limited to maximize vehicle interior space. For enhanced safety, vehicle seats may be provided with passive or active head restraints that are partially received within the interior of a vehicle seat. Other subsystems, such as an adjustable lumbar support, heating system, cooling system, or position adjustment systems may also be required to be accommodated, in the whole or in part, within the body of a vehicle seat. Accommodating all of these elements in a vehicle seat presents substantial packaging problems in the design of the vehicle seat.

Assembly of seat accessories into a seat back becomes more complicated when more of such systems are included. Seat accessories may be attached to the seat frame by specialized brackets that increase the cost of the seat assembly and also complicate the assembly process. Assembly is further complicated by requirements that massage systems, adjustable lumbar supports and temperature modification systems are normally designed to prevent non-functional movement of such systems. Non-functional movement of such systems may cause unwanted noise and vibration and may adversely impact performance of the systems.

Seat back panels are normally sculpted to maximize the leg room available for rear seat passengers. Recesses in the back panel further limit the space available for seat accessories. Back panels are normally tightly secured to a seat with conventional fasteners, such as screws or clip-type connectors. Depending upon design features and constraints, the back panel of a vehicle seat may either be a relatively rigid molded member or may be formed by a fabric, leather or other flexible material that may be stretched across a frame or otherwise secured to the seat back.

There is a need for a vehicle seat having a seat back that meets all crash test requirements and provides ample clearance for seat structures, and also facilitates assembly of seating accessories within the seat.

SUMMARY OF THE INVENTION

According to one aspect of the present invention, a vehicle seat having a seat back is provided. The seat back includes a seat back frame and a seat back cushion secured to the seat back frame that faces in a forward direction. The seat back cushion is supported by the seat back frame. A back panel that faces in a rearward direction is secured by at least one connector to the seat back frame. The connector secures the back panel flush to the seat back in a normal position and has a retaining feature for securing the back panel in a spaced relationship relative to the seat back in an actuated position. The back panel may be moved from the normal position to the actuated position by a force applied to the seat in a collision.

According to another aspect of the present invention, a vehicle seat is provided that has a seat back for supporting the back of a seat occupant. A cushion is secured to the seat back support assembly and a suspension assembly is provided for supporting the cushion relative to the seat back support assembly. A back panel is provided as part of the seat back support assembly that is movable between a flush position in which the back panel is secured flush to the other parts of the seat back support assembly and a spaced position in which the back panel is retained in a spaced relationship relative to the other parts of the seat back support assembly. A plurality of connectors extend from a B-side of the back panel and engage the seat back support assembly. Compression of the seat back by the penetration of the torso of a seat occupant into the seat back may cause the back panel to move from the flush position to the spaced position as guided by the connectors. The vehicle seat back may be provided with a plurality of connectors extending from the B-side of the back panel that engage the seat back frame wherein compression of the seat back is applied to the back to move the back panel from the flush position to the spaced position.

According to other aspects of the present invention, the seat back may further comprise a lumbar support assembly, and a thermal conditioning system, such as a heating or cooling system, that is secured to the back panel. Other types of systems that may be assembled to a seat back may include a massage system, side bolster adjustment systems, upper foam adjustment mechanisms, power head restraint adjustment mechanisms, wiring, and other electronic modules.

According to other aspects of the invention, a plurality of connectors may be provided that secure the back panel to the seat frame and provide at least one guide for controlling movement of the back panel. The connectors may have a full insertion stop that is engaged when the back panel is in the normal position and an extended stop that is engaged when the back panel is in the actuated position.

According to other aspects of the invention, the back panel may be either a solid shell or may include a flexible sheet that forms part of a trim assembly. The back panel may be sculpted with an A surface that is recessed into the back rest.

These and other aspects of the present invention will be better understood in view of the attached drawings and following detailed description of the illustrated embodiments of the invention.

BRIEF DESCRIPTION OF THE DRAWINGS

FIG. 1 is a fragmentary side elevation view of a vehicle seat having a movable back panel made in accordance with the present invention;

FIG. 2 is a diagrammatic top plan view showing the vehicle seat having connectors and guide elements in the non-actuated position of the back panel;

FIG. 3 is a cross-sectional view taken along the line 3-3 in FIG. 2 showing the back panel in its non-actuated position;

FIG. 4 is a cross-sectional view similar to that of FIG. 3, but showing the back panel in its actuated position;

FIG. 8 is a front elevation view of a seat back having a torsion bar according to another alternative embodiment of the present invention; and FIG. 9 is a diagrammatic side elevation view of the embodiment shown in FIG. 8.

DETAILED DESCRIPTION OF THE PREFERRED EMBODIMENT(S)

Figure 5:
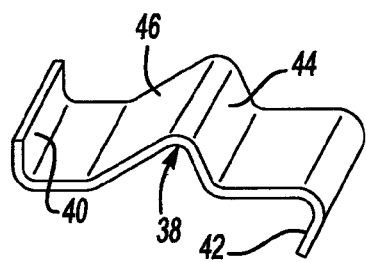
FIG. 5 is a perspective view of a connector for the back panel made in accordance with one embodiment of the invention.

Referring to FIG. 1, a vehicle seat 10 having a seat back 12 to which a seat accessory 14 is attached is attached to a back panel 16. Examples of seat accessories 14 that may be incorporated into a seat back include lumbar supports, heating and/or cooling systems, bolsters, massage systems, and the like. The back panel 16 is shown in a flush position in solid lines and in an actuated position in phantom lines. The arrows in FIG. 1 indicate the extent of displacement 18 of the back panel 16 that occurs when a seat occupant's torso (not shown) penetrates into the seat back 12 in the event of a collision. Three different embodiments of the invention are shown that illustrate three different ways of controlling the movement of the back panel 16 in FIGS. 2-9.

Referring to FIG. 2, one embodiment is shown in which an upper connector 20, such as a clip, is received in an upper receptacle 22. A lower connector 26 is secured to the seat back 12 and is received in a lower receptacle 28. While the illustrated embodiment shows the upper and lower connectors 20 and 26 being attached to the back panel 16, it should be understood that the upper and lower connectors 20, 26 could be secured to the back panel 16 without departing from the spirit and scope of the invention. Upper and lower guide members 32, 34, or guide pins, are received in guide receptacles 36 that are secured to the seat back 12. As with the connectors, the guide members 32, 34 and guide receptacles 36 could be reversed with the guide members 32, 34 being secured to the seat back 12 and the guide receptacles 36 being provided on the back panel 16.

Referring to FIGS. 3 and 4, operation of the connectors 20, 26 and guide members 32, 34 will be described in greater detail. In FIG. 3, the back panel 16 is shown in its flush position with the upper and lower clips, 20, 26 being received in the upper and lower receptacles so that they are retained by detents 38. A stop 40 is provided on one end of the connectors 20, 26 that limits the movement of the back panel 16 away from the seat back 12. As illustrated in FIG. 4, the upper and lower connectors 20, 26 are secured to the back panel 16 by an anchoring end 42 of the connectors 20, 26. The back panel 16 and the upper and lower connectors 20, 26 are shown in their actuated position. In the event of a collision, an occupant's torso applies a compressive force to the seat back 12 that is transferred through the seat to the back panel 16. When sufficient force is applied to the back panel 16, the back panel shifts from the position shown in FIG. 3 over an actuation ramp surface 44 until the back panel reaches the position shown in FIG. 4. The back panel may be reset by pushing the back panel 16 from the rear to move it from the position shown in solid lines in FIG. 4 to the position shown in phantom lines in FIG. 4. When the back panel 16 is reset, the connectors 20, 26 move into the upper and lower receptacles 22 and 28 passing over the return ramp surfaces 46. The upper and lower guide members 32, 34 move relative to the guide receptacles 36 to keep the back panel 16 in alignment with the seat back 12.

Referring to FIG. 5, one example of a connector that may comprise either the upper connector 20 or the lower connector 26 is illustrated in greater detail. The connector 20 or 26 are each provided with detent 38 that is formed by the actuation ramp surface 44 and return ramp surface 46. The stop 40 is provided on the opposite end of the connector from the anchoring end 42.

The connectors 20, 26 or guide members 32, 34 may be provided with a contrasting color area or other indicia that are only visible when the back panel 16 is in its actuated position. The purpose of the indicia is to indicate to a user after a collision that the back panel has been shifted to its actuated position. The indicia may include instructions as to how to reset the back panel 16.

Figure 6:
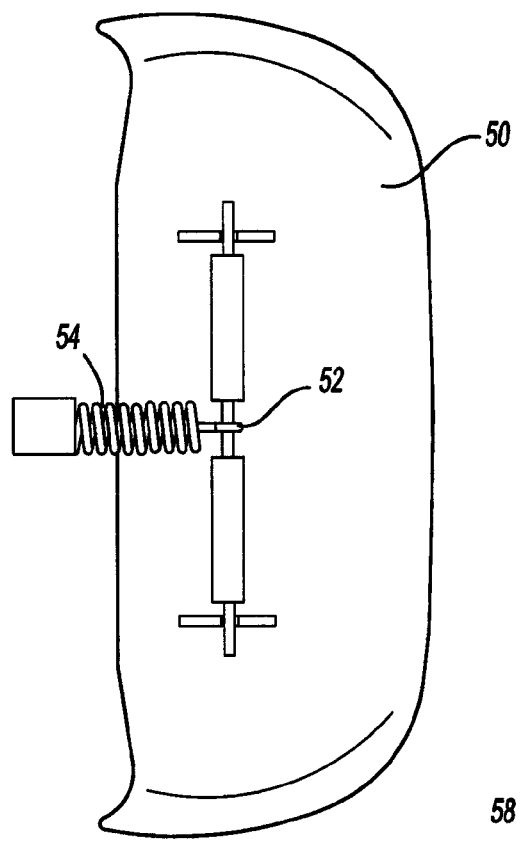
FIG. 6 is a diagrammatic top plan view of the linkage and spring of an alternative embodiment of the present invention.
Figure 7:
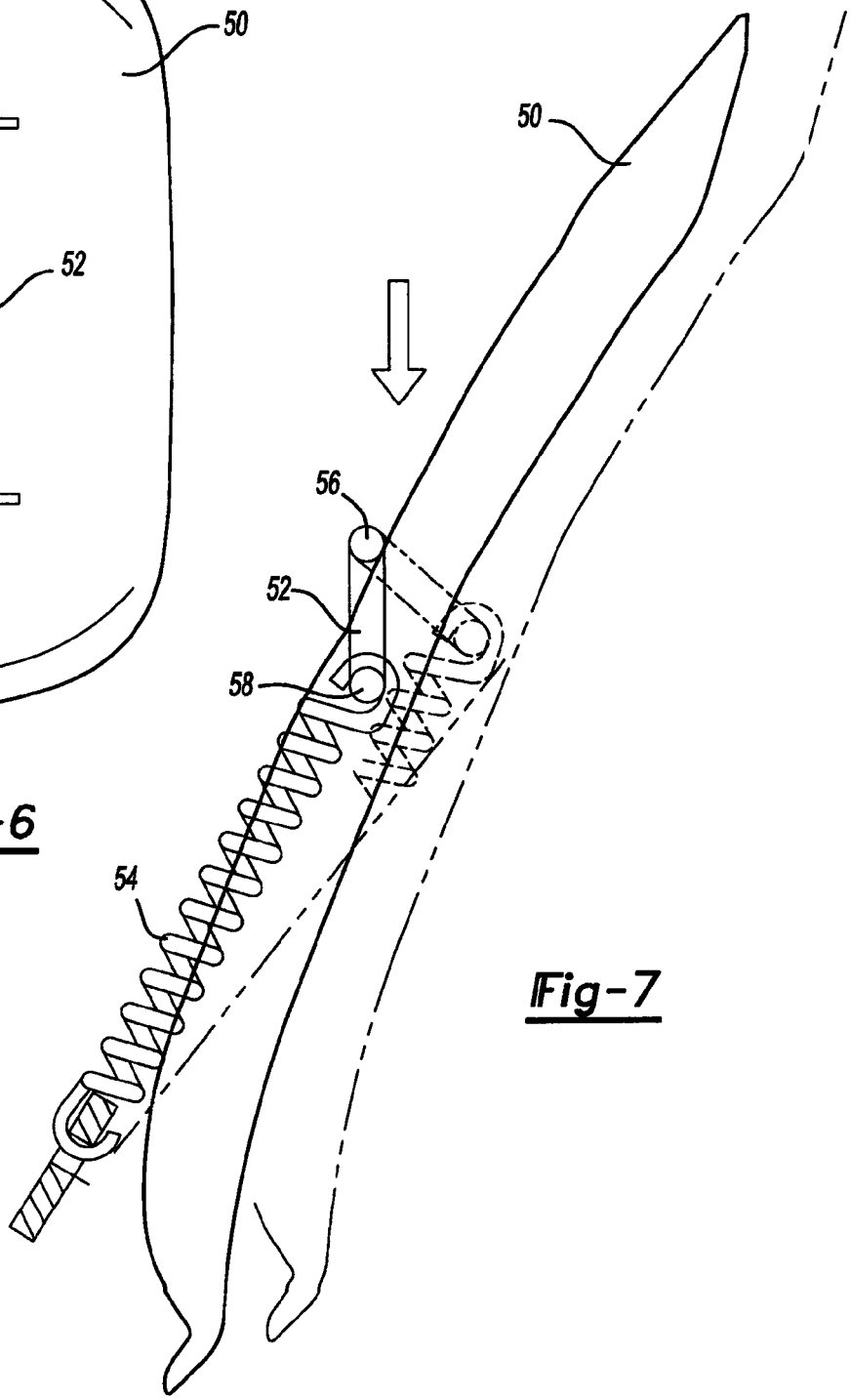
FIG. 7 is a diagrammatic side elevation view of the embodiment shown in FIG. 6.

Referring to FIGS. 6 and 7, an alternative embodiment is shown in which the back panel 50 may automatically reset itself after actuation to the flush position. The back panel 50 is connected by a link 52 to a spring 54. The spring 54 exerts a biasing force biasing the link 52 downwardly that causes the back panel to be urged toward the flush position. The link 52 is pivotally connected to a seat pivot 56 that is secured to the seat back 12. The spring 54 is connected to a back panel pivot 58 that is secured to the back panel 50. In the event of a collision, the back panel may react to penetration of an occupant's torso into the seat back by moving from the position shown in solid lines in FIG. 7 to the position shown in phantom lines in FIG. 7. Movement of the back panel in this manner acts against the biasing force of the spring 54 and causes the link 52 to pivot. After the collision event, the spring 54 automatically causes the back panel 50 to move from the position shown in phantom lines in FIG. 7 to the position shown in solid lines.

Referring to FIGS. 8 and 9, another embodiment is shown in which a back panel 70 is automatically reset by a torsion bar 72 that extends across the seat. In the illustrated embodiment, the torsion bar 72 extends in a vertical direction. It should be understood that the torsion bar 72 could also extend across the back panel 70 horizontally or at an other angle. The torsion bar 72 is received in an upper torsion bar receptacle that is secured to the seat back. A lower torsion bar receptacle 76 retains the lower end of the torsion bar 72. The lower torsion bar receptacle 76 is secured to the seat back. The torsion bar is also received in upper and lower torsion bar retainers 78 and 80 that are secured to the back panel 70. An opening 82 is provided in the upper and lower torsion bar receptacles 74, 76 through which the torsion bar 72 is received. A guide member 86 is secured to the back panel 70, as shown in FIG. 9. The guide member 86 is received in one of the guide receptacles 88 that are secured to the seat back 12.

In the event of a collision, the back panel 70 may be released from the seat back and shifted to its actuated position, as shown in phantom lines in FIG. 9. After a collision event, the torsion bar returns to its normal position automatically resetting the back panel 70 to its flush position shown in solid lines in FIG. 9.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat having a back rest for supporting the back of a seat occupant, the backrest comprising:
    a seat back support assembly;
    a cushion attached to the seat back support assembly;
    a back panel that is positioned at an external surface of the back rest to face in a rearward direction and is movable between a flush position in which the back panel is secured flush to the seat back support assembly and in which the back panel forms the external surface and a spaced position in which the back panel is retained in a spaced relationship relative to the seat back support assembly;
    a linkage operatively connected between the back panel and the seat back support assembly, wherein the linkage facilitates movement of the back panel between the flush and spaced positions;
    a resilient member that biases the linkage to move the back panel toward the flush position, wherein movement of the back panel from the flush position to the spaced position in a collision event is opposed by the biasing force of the resilient member, and wherein the resilient member automatically resets the linkage after the collision event by returning the panel back to the flush position.

2. The vehicle seat of claim 1 wherein a seat accessory is attached to the back panel.

3. The vehicle seat of claim 2 wherein the back panel is moved to the spaced position to displace the seat accessory with the back panel.

* * * * *